United States Patent [19]

Struss et al.

[11] Patent Number: 4,686,253

[45] Date of Patent: Aug. 11, 1987

[54] LIGHTWEIGHT JOINT COMPOUND HAVING IMPROVED PAINTABILITY

[75] Inventors: Arthur W. Struss, Libertyville; Terrance L. Williams, Crystal Lake; Lawrence T. Eby, Arlington Heights, all of Ill.

[73] Assignee: United States Gypsum Company, Chicago, Ill.

[21] Appl. No.: 831,973

[22] Filed: Feb. 20, 1986

[51] Int. Cl.⁴ .............................................. C04B 11/16
[52] U.S. Cl. .................................... 524/44; 524/43; 524/47; 524/53; 524/268; 524/423; 524/425; 524/445; 523/212; 523/218; 106/113; 106/114; 106/115; 106/308 Q
[58] Field of Search ..................... 524/43, 44, 47, 53, 524/268, 423, 425, 445; 523/209, 212, 218; 106/109, 110, 111, 112, 113, 114, 115, 308 Q

[56] References Cited

U.S. PATENT DOCUMENTS

| | | | |
|---|---|---|---|
| Re. 29,753 | 9/1978 | Williams | 106/85 |
| 2,690,594 | 3/1952 | Kirksey | 524/53 |
| 3,321,410 | 5/1967 | MacArthur et al. | 501/85 |
| 3,386,223 | 6/1968 | Wegwerth | 52/741 |
| 3,565,851 | 2/1971 | Neuroth | 523/212 |
| 3,649,588 | 3/1972 | Kennedy-Skipton | 523/212 |
| 3,658,564 | 4/1972 | Gerow et al. | 106/84 |
| 4,287,103 | 9/1981 | Francis et al. | 524/47 |
| 4,454,267 | 6/1984 | Williams | 524/43 |
| 4,454,288 | 6/1984 | Lee et al. | 524/588 |

*Primary Examiner*—Morton Foelak
*Assistant Examiner*—Nathan M. Nutter
*Attorney, Agent, or Firm*—Samuel Kurlandsky; Robert M. Didrick; Robert H. Robinson

[57] ABSTRACT

Expanded perlite coated with a composition to render the perlite impervious to water, and a joint compound incorporating the same. The perlite is ground prior to expansion to provide subsequently expanded perlite having a mean particle size from about from about 50 to about 70 microns, the joint compound formed from the perlite having greater uniformity in paint gloss appearance between the painted surface of the joint compound and the painted surface of the gypsum wallboard on which the joint compound is applied.

21 Claims, 1 Drawing Figure

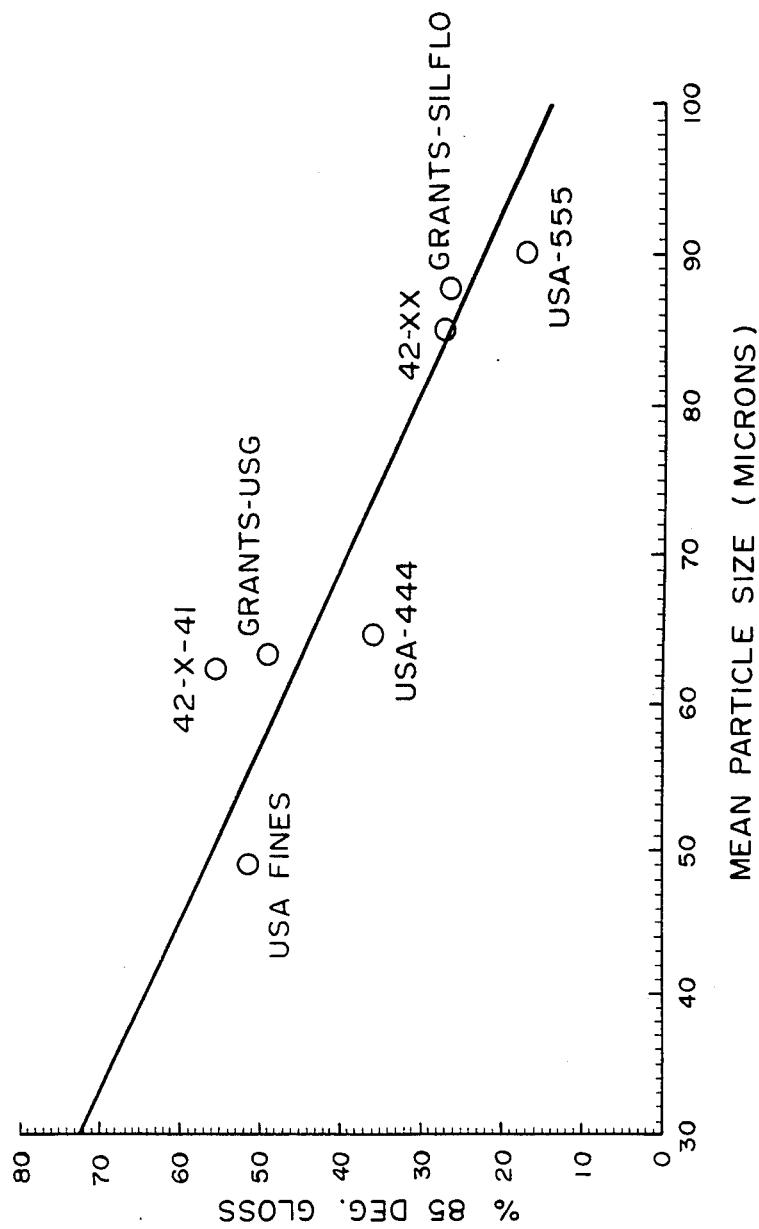

LIGHTWEIGHT JOINT COMPOUND HAVING IMPROVED PAINTABILITY

BACKGROUND OF THE INVENTION

1. Field of the Invention

The present invention relates to a joint compound for use in filling and coating the joints between adjacent gypsum wallboards, and more particularly refers to a joint compound of the type described which is of light weight, is readily sandable, has low shrinkage, provides a reduction in transportation costs because of its light weight, and additionally provides improved paintability properties over prior art lightweight joint compounds.

In the construction of buildings, one of the most common elements is gypsum wallboard, often known as "drywall", used to construct walls and/or ceilings. Walls made from gypsum wallboard are conventionally constructed by affixing the wallboard panels to studs or joists, and filling and coating the joints between panels with a specially prepared adhesive called a "joint compound". This process generally proceeds in the following fashion: a taping grade joint compound is placed within the joint formed by the abutted edges of the wallboards, and a liquid-permeable tape is embedded within the taping compound. When dry (or set), a second coating comprising a topping grade joint compound is applied over the joint. This may be sanded lightly, and then a third coat applied and conventionally finished. Another grade of joint compound which may be used is an all-purpose grade, as the name suggests. It is used both for embedding the tape and for applying the compound as a finishing coat. In some instances, a patterned effect or textured finish may be given to the finished wall and joint with the all-purpose joint compound.

The primary difference in the past between the various grades of joint compounds has been in the amounts of each ingredient utilized. Thus, no matter what the grade, joint compounds invariably include a filler and a binder. More binder is used for the taping grade than for the topping grade. Typical fillers may be calcium carbonate, calcium sulfate hemihydrate, or calcium sulfate dihydrate. When calcium sulfate hemihydrate is used, a setting-type joint compound is formed. An Example of a setting-type joint compound is disclosed in U.S. Pat. No. 3,297,601. When calcium carbonate or calcium sulfate dihydrate is utilized as a filler, the joint compound is a drying-type and must utilize a binder such as polyvinyl acetate to provide cohesion among the particles and adhesion to the wallboard paper.

In U.S. Pat. No. Re. 29,753, joint compounds are disclosed which are free of asbestos and utilize attapulgus clay to provide the non-leveling properties previously obtained by the use of asbestos fibers. Conventional compounds with or without attapulgus clay have proven to be excellent. However, these joint compounds are quite heavy and expensive to transport and heavy for the workmen to carry. Additionally, when conventional joint compounds dry, they acquire a hard texture and are difficult to sand in order to provide the joint with a smooth surface. It would be desirable to have a joint compound which is of lighter weight than conventional joint compounds, shrinks less, and which, when dry, can be readily sanded to provide a smooth surface.

In U.S. Pat. No. 4,454,267 a novel joint compound is disclosed and claimed comprising expanded perlite treated with a silicone polymer as one of the components to cause a substantial reduction in the density of the joint compound, with the resulting reduction in the cost of transportation and ease of working with the material. The joint compound disclosed in this patent was found to be very well suited for use in construction. However, it was found that, in part because of the mean particle size of the treated perlite, there resulted a considerable gloss difference between paint applied over the joint compound and paint applied over the wallboard paper itself.

In U.S. Ser. No. 752,268 filed July 5, 1985 and now U.S. Pat. No. 4,657,594 there is a disclosure of a joint compound utilizing expanded perlite which is treated with an amino-functional siloxane or silicone polymer together with a silicone wetting agent to improve the uniformity between the painted surface of a joint compound and the painted surface of the paper cover sheets of the gypsum wallboard. This resulted in an improvement in paintability as well as in adhesion of the joint compound to wallboard surfaces. However, the improvement was not as great as would be desired.

SUMMARY OF THE INVENTION

It is accordingly an object of the present invention to provide a joint compound which is free of asbestos.

It is a further object to provide a joint compound which has properties such as non-leveling, non-cracking and good adhesion generally required of a good joint compound.

It is still further an object to provide a joint compound which is substantially lighter in weight than conventional joint compounds, and which may therefore be transported at lower cost, and which may be more readily handled by workmen.

It is an additional object to provide a joint compound having excellent non-cracking, low shrinkage properties.

It is a primary object to provide a joint compound which has excellent paintabiity wherein the gloss difference between paint applied over the joint compound and paint applied over the wallboard paper is greatly reduced.

Other objects and advantages of the invention will become apparent upon reference to the following description.

According to the present invention, a joint compound, exhibiting the properties described, is provided by a formulation which comprises a conventional filler such as calcium carbonate, calcium sulfate dihydrate, or calcium sulfate hemihydrate, a conventional binder such as polyvinyl acetate, a non-leveling and slip providing material such as attapulgus clay, and a water retention or thickening agent such a hydroxypropyl methylcellulose. Additionally the composition of the joint compound includes expanded perlite which has a finer mean particle size than previously utilized expanded perlite and is specially treated to render it water-repellent. The presence of the perlite substantially reduces the density of the joint compound and reduces the cost of transportation. The perlite ore is first sufficiently ground so that when it is expanded, the mean particle size of the expanded perlite is within certain defined limits. The perlite is then treated to render it water-repellent. The joint compound having the specially ground and treated perlite incorporated therein exhibits excellent properties including excellent paintability.

BRIEF DESCRIPTION OF THE DRAWING

In the drawing:
The drawing is a graph showing the effect on gloss as a result of the variation in mean particle size of the expanded perlite samples.

DESCRIPTION OF THE PREFERRED EMBODIMENTS

A joint compound suitable for use in construction must have certain properties which are provided by a number of conventional ingredients. The first necessary ingredient is a filler. Any common filler disclosed in the art may be utilized. A preferred filler is finely ground calcium carbonate. Other fillers which may be used are calcium sulfate dihydrate and calcium sulfate hemihydrate. In addition, mica, talc, pyrophylite, sericite, diatomaceous earth, and clays such as kaolinite may be used together with the primary fillers.

Another required ingredient of a joint compound is a non-leveling agent. A preferred non-leveling agent is attapulgus clay. Other non-leveling agents are mixtures of amylopectin starch together with various modified clays in a ratio by weight of about 5:1. Still other non-leveling agents which can be used are various bentonites. The non-leveling agents impart certain rheological properties to the joint compound such as thixotropy. It has been further found that the expanded perlite itself contributes to the desirable rheological properties to a considerable degree.

Still another material required in a joint compound is a thickener. Among the common thickeners are hydroxypropyl methylcellulose, methylcellulose, hydroxyethylcellulose, hydroxyethyl methylcellulose, and sodium carboxymethylcellulose. The thickeners may be used alone or in combination with one another.

Another ingredient required of a joint compound, particularly in the case of a drying-type joint compound, is a binder. Among the preferred binders is polyvinyl acetate. Other binders which may be utilized are polyvinyl alcohol, ethylene vinyl acetate co-polymer, vinylacrylic co-polymer, styrenebutadiene, other acrylic polymers, and starch. Additional ingredients which may be utilized in joint compounds are preservatives, wetting agents, defoamers, and plasticizers.

In the examples which follow, the joint compound was formulated with expanded and treated perlite particles of different sizes. In the examples the same basic joint compound formulation was utilized and is generally one which is similar to that disclosed in U.S. Pat. No. 4,454,267. The general formulation is disclosed in Table I below:

TABLE I

| FORMULATION DRY WEIGHT | |
|---|---|
| Material | Amount |
| Treated Expanded Perlite | 180 g |
| Calcium Carbonate | 707.7 g |
| Attapulgus Clay | 50 g |
| Hydroxypropyl Methylcellulose | 8 g |
| Polyvinyl Acetate | 55 g |
| Cosan 158 | 1.0 g |
| Troysan 174 | 1.0 g |
| Total Water | 780 ml |
| Density | 6.9 Lb/Gal. |
| Viscosity | 345 Bu. |

Although, as stated, a single general formulation was utilized, the formulation may be altered within the limits disclosed below in Table II, and as established in U.S. Pat. No. 4,454,267.

TABLE II

|  | Lower Limit | Upper Limit |
|---|---|---|
| Expanded and Treated Perlite | 3.5% | 25% |
| Non-leveling Agent | 0.5% | 7% |
| Thickener | 0.3% | 1.8% |
| Binder | 0.5% | 10% |
| Fillers | 38% | 93% |

Of the trademarked materials listed above in Table I, "COSAN 158" is a fungicide marketed and manufactured by the Cosan Chemical Company. "TROYSAN 174" is a preservative manufactured and marketed by the Troy Chemical Company, and is utilized to preserve the joint compound.

All the joint compounds produced in the examples were subjected to the conventional tests utilized for determining the properties of joint compounds to determine whether they are suitable for such commercial use. Among the properties tested were ease of trowel application, hand sanding properties, cracking and fissure resistance, bonding to a liquid-permeable tape, edge delamination, resistance to deterioration under humid conditions, ease of mechanical sanding, shrinkage, shelf life, and freeze-thaw stability. Each of the joint compounds of the examples exhibited excellent properties in all the tests performed.

The ingredient of the present lightweight joint compound which results in a reduction in density of the joint compound is expanded and specially treated perlite. Perlite is a form of glassy rock similar to obsidian. It generally contains 65–75% $SiO_2$, 10–20% $al_2O_3$, 2–5% $H_2O$, and smaller amounts of soda, potash, and lime. When perlite is heated to the softening point, it expands to form a light fluffy material similar to pumice. In one method of preparing the perlite for use in the present invention it is first ground to a size finer than 200 mesh. The ground perlite is then heated to a temperature of about 1500° F. This process is carried out in a perlite expander by heating the air to 1500° F. The finely ground perlite is then introduced into the heated air. As it is carried by the air, it is heated and pops like popcorn. Expanded perlite, is a very lightweight material. However, it contains many fine cracks and fissures, and, when placed in contact with water, the water penetrates the cracks and fissures and enters into the air filled cavities of the perlite, thereby greatly increasing the weight of the particles. Consequently, before utilizing expanded perlite in making joint compounds, it must first be treated to render it water-resistant or water-repellent. This may be done in one of several different ways. The preferred method is to treat the expanded perlite with a silicone compound which prevents water penetration of the cracks and fissures. Other materials may be utilized to treat the expanded perlite in order render it water-repellent. Among them are various materials such as silanes, quaternary ammonium salt, and emulsified resin polymers such as polyvinyl acetate, ethylene vinyl acetate, the terpolymers of ethylene, vinyl acetate, and vinyl chloride. Additionally, material such as sodium or potassium silicate may be utilized to treat the expanded perlite to render it water-repellent, as disclosed in U.S. Pat. No. 3,658,564 issued to Stephen A. Georow.

EXAMPLES 1-3

In Examples 1-3, preliminary tests were made to determine the effect on paintability produced by utilizing expanded and treated perlite having different particle sizes. The starting material was expanded perlite treated with a silicone polymer and marketed as USA 555 by Silflo. It was screened to separate it into a +200 mesh fraction and a −200 mesh fraction. The material as supplied, and the two fractions were separately utilized in preparing joint compounds according to the formulation of Table I. The USA 555 as supplied was found to have a mean particle size of 90.1 microns. Table III below shows the paint gloss results at 85° obtained for joint compounds utilizing the material as supplied as well as the two fractions:

TABLE III

PAINT GLOSS COMPARISON OF STANDARD JOINT COMPOUND MADE WITH DIFFERENT PERLITE PARTICLES SIZES

| Number | Expanded Perlite | Percent of Board Paper Gloss |
|---|---|---|
| 1 | USA 555 (as Supplied) | 29.4% |
| 2 | +200 mesh fraction | 21.0% |
| 3 | −200 mesh fraction | 53.3% |

In evaluating uniformity in paintability, joint compound strips were applied on a 4'×4' sheet of gypsum wallboard using an Ames box manufactured by Ames Taping Tools, Belmont, Calif. After the joint compound had dried, the entire board was roller painted with one coat of a white semi-gloss paint. Sears Easy Living Paint was utilized. Measurements were taken at 85° from vertical (low angle sheen) using a Gardner glossmeter. The percent gloss values were calculated to compare the gloss over the joint to the gloss over the board paper.

As can be seen from the results shown in Table III above, the joint compound formed from the −200 mesh fraction exhibited a much higher gloss value (53.3%) than either the material as supplied or the +200 mesh fraction. It has been found that an 85° gloss value of about 40% or greater provides a paintability property which is sufficient for commercial use, since when viewed by an observer at normal viewing distance no difference in gloss over the painted joint compound and the painted wallboard surface is readily apparent.

In order further to determine the effect of particle size of expanded and treated perlite on paintability of a joint compound prepared therefrom, various perlite materials were utilized, some prepared and treated by commercial manufacturers, and others prepared from raw perlite ore purchased from suppliers or produced from a perlite mine owned by the USG Corporation. In some cases, the perlite ore was first finely ground, and then expanded and treated to render the particles water repellent.

The expanded and treated perlites as produced, as well as the perlite obtained from commercial suppliers were then formulated to produce joint compounds having the general composition shown in Table I. The gloss uniformity of the various joint compounds formed was measured as described above. Examples 4-10 listed in Table IV below show the various expanded perlite materials used, their mean particle size after expansion, and the results obtained from gloss tests made on joint compounds prepared from the various expanded perlite samples.

TABLE IV

JOINT COMPOUNDS PREPARED FROM EXPANDED AND TREATED PERLITES HAVING DIFFERENT MEAN SIZES

| Example Number | (Supplier) | Mean Particle Size Microns | 1% Finer Than Value In Microns | 99% Finer Than Value In Microns | Surface Area Square CM/CC | Percent 85° Gloss |
|---|---|---|---|---|---|---|
| 4 | 42-X-41 (SILBRICO) | 62.5 | 7.45 | 182.0 | 1480 | 55.7 |
| 5 | USA FINES (SIL-FLO) | 49.2 | 7.82 | 146.3 | 1650 | 50.5 |
| 6 | GRANTS-USG (USG) | 63.4 | 7.73 | 202.3 | 1850 | 49.15 |
| 7 | USA 444 (SIL-FLO) | 64.7 | 10.00 | 200.4 | 1280 | 36.0 |
| 8 | 42-XX (SILBRICO) | 85.2 | 9.20 | 207.5 | 1100 | 27.5 |
| 9 | GRANTS-SIL-FLO (USG) | 87.8 | 11.30 | 214.1 | 990 | 26.6 |
| 10 | USA 555 (SIL-FLO) | 90.1 | 18.60 | 264.4 | 880 | 17.4 |

All the perlite samples of Examples 4-10 above were treated with an aminosiloxane resin to render them water-repellent, as disclosed and claimed in U.S. Ser. No. 752,268. The formulation of the treating agent based on dry weight percent in relation to the perlite was as follows:

TABLE V

| | |
|---|---|
| 0.15% | UCAR ® Silicone - ALE-75 |
| 0.05% | SILWET ® L-77 |

UCAR ® Silicone-ALE-75 is a non-ionic, 60% active oil-in-water emulsion containing a blend of dimethylsilicone and reactive amino-functional silicone copolymers. The material is manufactured and marketed by Union Carbide Corporation.

SILWET ® L-77 is one of a group of surface active copolymers which are polyalkylene oxide modified polydimethylsiloxanes. Like most surface active materials, they contain discrete hydrophilic and hydrophobic segments. These product have the general formula:

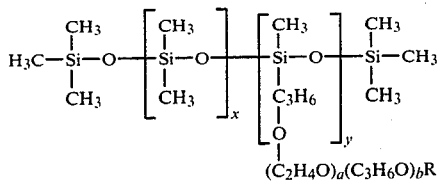

in which "R" can be either hydrogen or a lower alkyl radical. They contain Si—O—C bonds. Their general formula is:

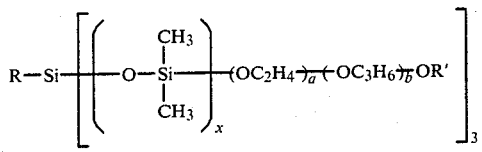

where "R" and "R'" are lower alkyls.

By varying the ratio and distribution of the segments, unique properties and performance are achieved which are not possible with conventional organic surfactants. This product is manufactured and sold by Union Carbide.

Regarding the sources of the various perlite samples listed above in Examples 4–10, 42-X-41 (SIBRICO) is a finely ground material prepared for USG Corporation by the SILBRICO Corporation, and expanded and treated with the siloxane composition disclosed above in Table V applied thereto.

USA FINES was prepared by Sil-Flo, Inc. and coated with the siloxane composition disclosed in TABLE V.

GRANTS-USG was prepared from the perlite ore mined at Grants, N.M. of the USG Corporation. The perlite ore was finely ground until it exhibited the following particle sizes:

| A. Mean Size | 13.3 Microns |
| B. Bottom Size (1% Finer Than) | 0.81 Micron |
| C. Top Size (99% Finer Than) | 81.7 Microns |

The fine ore particles were then expanded as described above and coated with the siloxane composition of TABLE V above.

USA 444 (SIL-FLO) is a product made by Sil-Flo, Inc. and coated with the siloxane formulation of Table V.

GRANTS-SIL-FLO is a product prepared by Sil-Flo, Inc. from perlite ore mined at the Grants mine and expanded and treated by Sil-Flo with the siloxane coating in Table V.

USA 555 is a standard expanded perlite product marketed by Sil-Flo, Inc., which is expanded and subsequently coated with the siloxane composition of Table V.

42XX is a standard expanded perlite product marketed by the SILBRICO Corporation and subsequently coated with the siloxane composition of Table V.

The drawing contains a graph obtained by plotting values obtained from the tests of Examples 4–10 shown in Table IV above. In each case the value for the percent of 85° gloss are the mean values obtained from several tests with each of the expanded perlite samples tested. The mean particle size was measured by a MICROTRAC Leeds and Northup particle size analyzer.

As can be seen from the graph of the drawing, the gloss values taken at 85° are inversely proportional to the mean particle size of the expanded perlite. It has been determined that the gloss value of a good marketable joint compound should be at least about 40%. At such a value it has been found that there is no readily apparent gloss difference between a painted joint compound surface and a painted gypsum wallboard paper surface when viewed by a casual observer at a normal distance from the surface viewed.

As can be further seen in the graph, a 40% value corresponds to a mean particle size of about 70 microns. As the mean particle size of the expanded perlite decreases, the gloss value increases. However, it has been found that when the mean particle size of the expanded perlite reaches a value of about 50 microns, excess shrinkage is exhibited by the joint compound formulated from perlite particles of this size, rendering the joint compound unsuitable for some applications. Excess shrinkage may be empirically defined as a property of a joint compound which requires that three coats of the joint compound be used to cover a cornerbead, as opposed to a joint compound having low shrinkage where only two coats are required to adequately cover a cornerbead. From the experiments of Examples 4–10 and from the graph of the drawing it has been determined that in order to obtain a joint compound having good gloss properties, that is, a gloss percentage value taken at 85° of 40% or more, and still not having excessive shrinkage properties, the mean particle size of the expanded perlite should be from about 50 to about 70 microns. Optimum results may be obtained from expanded perlite having a mean particle size from about 55 to about 68 microns. Of all the materials tested and shown in Table IV, the GRANTS-USG material having a mean particle size of 63.4 microns appeared to be optimum.

The lightweight joint compound of the present invention has many advantages over joint compounds disclosed in the prior art. One advantage over some of the disclosed materials is that is is lighter in weight that these conventional joint compounds. Consequently, transportation costs are less. Additionally, because of its light weight, the joint compound can be carried around more easily in buckets, on a trowl or in a bazooka, and worked with more easily by workmen. When the material of the present invention is utilized, at the end of an eight hour day the workmen are considerably less tired than when they use the heavier joint compounds available in the prior art. Further, after the joint compound has been applied and dried, it is much easier to sand then conventional joint compounds. After sanding, a smooth finished wall is obtained. The present joint compound when mean particle size is kept within the defined limits has excellent low shrinkage properties. Because of this property, it is not necessary to utilize talc or mica, common ingredients utilized in conventional joint compounds to prevent shrinkage and cracking. The joint compound also has very good application properties, generally better than those of conventional joint compounds. A prime advantage of the present joint compounds which utilizes expanded perlite whose mean particle size is within a well defined range and generally smaller than that of conventional expanded perlite, excellent paintability properties are obtained, providing gloss uniformity between areas of painted joint compound and areas of painted paper-covered gypsum wallboard.

It is to be understood that the invention is not to be limited to the exact details of operation or materials described, as obvious modifications and equivalents will be apparent to one skilled in the art.

Invention is claimed as follows:

1. A lightweight joint compound having properties suitable for use in finishing joints between the edges of adjacent wallboards, and having improved paintability properties, said joint compound comprising:
   (1) a filler selected from the group consisting of calcium carbonate and calcium sulfate,
   (2) a non-leveling agent,
   (3) expanded perlite which has been treated with a composition to render said perlite water-impervious, said perlite having a mean particle size no greater than about 70 microns and being present in an amount of from about 3.5% to about 25% based on the dry weight of said joint compound,
   (4) a thickener,
   (5) a binder, and
   (6) sufficient water to adjust the viscosity to render said joint compound suitable for use.

2. A lightweight joint compound according to claim 1, wherein said perlite has a mean particle size of from about 50 to about 70 microns.

3. A lightweight joint compound according to claim 1, wherein said perlite has a mean particle size of from about 55 to about 68 microns.

4. A lightweight joint compound according to claim 1, wherein said perlite has a mean particle size of about 64 microns.

5. A lightweight joint compound according to claim 1, wherein said composition for rendering said perlite impervious to water is a silicone resin.

6. A lightweight joint compound according to claim 1, wherein said composition to render said perlite impervious to water is a dimethylsiloxane.

7. A lightweight joint compound according to claim 1, wherein said composition to render said perlite impervious to water is an alkali metal silicate.

8. A lightweight joint compound according to claim 1, wherein said composition to render said perlite impervious to water is an alkylaminosilane.

9. A lightweight joint compound according to claim 1, wherein said composition to render said perlite impervious to water is an aminosiloxane polymer.

10. A lightweight joint compound according to claim 9, wherein said composition to render said perlite impervious to water additionally contains a silicone wetting agent.

11. A lightweight joint compound according to claim 1, wherein said filler is present in an amount from about 38% to about 93% by dry weight of said joint compound.

12. A lightweight joint compound according to claim 1, wherein said filler is calcium carbonate.

13. A lightweight joint compound according to claim 1, wherein said filler is calcium sulfate.

14. A lightweight joint compound according to claim 1, wherein said non-leveling agent is present in an amount of from about 0.5% to about 7% by dry weight of said joint compound.

15. A lightweight joint compound according to claim 1, wherein said non-leveling agent is attapulgus clay.

16. A lightweight joint compound according to claim 1, wherein said binder is present in an amount of from about 0.5% to about 10% by dry weight of said joint compound.

17. A lightweight joint compound according to claim 1, wherein said binder is polyvinyl acetate.

18. A lightweight joint compound according to claim 1, wherein said thickener is present in an amount of from about 0.05% to about 1.8%.

19. A lightweight joint compound according to claim 1, wherein said thickener is hydroxypropyl methylcellulose.

20. A lightweight joint compound according to claim 1, wherein said thickener is hydroxyethylcellulose.

21. A lightweight joint compound according to claim 1, which is substantially free of mica.

* * * * *